Patented Dec. 11, 1923.

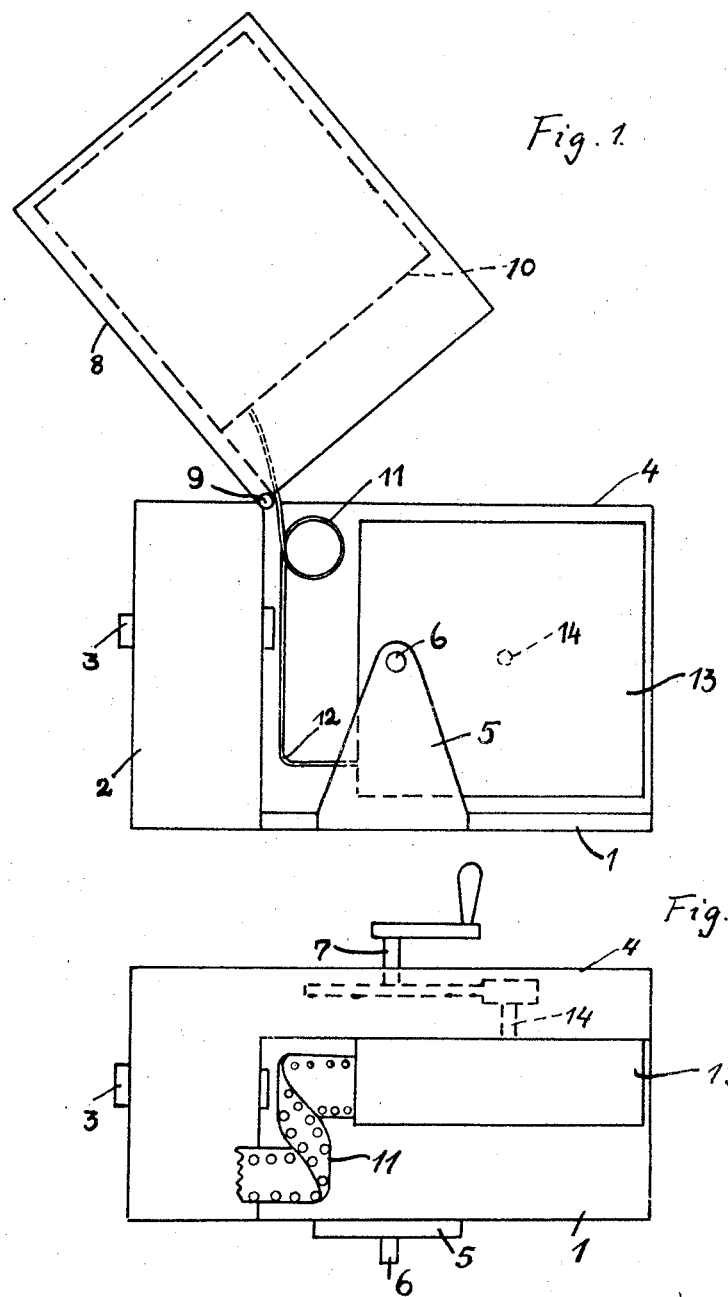

1,477,297

UNITED STATES PATENT OFFICE.

ODO D. TAUERN AND NIKOLAUS LYON, OF FREIBURG, GERMANY.

DEVICE FOR MOTION-PICTURE CAMERAS.

Application filed August 1, 1922. Serial No. 579,073.

*To all whom it may concern:*

Be it known that we, ODO D. TAUERN and NIKOLAUS LYON, citizens of Germany, and residents of Eggstrasse #5, Freiburg, Germany, have invented a new and useful Improvement in Devices for Motion-Picture Cameras, of which the following is a full, clear, and exact specification, reference being had therein to the accompanying drawing.

The invention relates to a film camera in which, in order to facilitate the insertion of the film, can be unfolded on a cross-joint near the upper front edges of the film cases in such manner that a film case can be inserted in the unfolding part, whereas the second film case is inserted in the main part. Both film cases are best placed alongside of each other in the closed camera. In this kind of folding device the winding of the film is exceedingly easy, particularly when a loop set at least to 260° is provided, whereby the loop of the film is also sufficiently souple when the camera is closed. On the other hand, the arrangement of the empty film case in the main portion of the camera on the driving shaft can be quickly and surely performed by simply placing the same on the driving shaft from the open side.

It is advantageous to have the drive of the empty film case between the latter and the wall of the camera, so that both film cases can be placed alongside of each other and the distance of the dark slides from each other, to be filled out by the loop of the film, is reduced to a minimum.

Another valuable feature of the camera is that the same is fitted with a cross axis for setting same on a tripod, the said axis being the same as the driving shaft and which passes approximately through the longitudinal and altitudinal middle point of the camera. By means of this, the entire driving gear is greatly simplified, the well balanced camera can be easily pointed and turned up-side-down and no shaking is caused by the driving gear, as its moment of torsion which is concentric to the tilting axle always presses the camera firmly against the adjusting stop to which it is set.

The drawing shows an application of the new camera, Fig. 1 being a side elevation of the opened camera, Fig. 2 being an overhead view, whereby the open part is omitted.

The camera has a front part 2 rigidly connected with its bottom 1, the said front part containing the objective 3 the shutter, and the feeding devices. The lateral part of the casing 4 is also rigidly connected with the bottom 1 and holds the finder, the driving gear for the empty film case and the other mechanism. A lateral stand 5 is also connected with the bottom 1 which, in connection with the outer wall of the casing part 4 serves to hang up the camera, being provided with a pin 6, which jointly with the driving shaft 7 on the same axis forms a cross-joint for the head of the tripod. The other walls of the camera form a folding casing 8, which can be opened on a cross-joint 9 as shown in the drawing.

The camera rests thus at a middle point on the pin 6 and the driving shaft 7 or a stand case surrounding the same, so that it is generally evenly balanced and can be easily swung in the tripod fork, and when working, may even be turned up-side-down without any disturbances or shaking taking place when in use.

The full film case 10 is inserted in the folding casing 8 where it is held firmly by means of guides, rollers or other contrivances. The unwinding film is first wound laterally in a coil in the loop 11 towards the side and then downward to the objective 3 and from thence bent downwards at 12 in a simple manner into the empty film case 13 in the same longitudinal plane as the objective 3. This empty film case can be inserted from the open side of the camera on the winding shaft 14 which is driven by the driving shaft 7. A sliding coupling or similar contrivances may also be inserted in the usual way.

The camera is manipulated in the following manner: When open, the full film case 10 is first inserted in the folding casing 8, the film is bent to the loop 11 and wound into the guide parts of the objective 3, hereupon or before the open empty film case is placed on shaft 14. The film is wound on to the same and the empty film case closed. The folding casing 8 must then be closed. Hereby the full film case 10 is placed alongside the empty film case 13 and the film loop 11 is bent with an angle of 450° altogether, and the camera is now ready for use.

Guiding devices may be provided for guiding the film at loop 11 and the bend 12, which guiding devices are not shown as they are not essential and may be built in various ways.

Having now more fully described and ascertained the nature of our invention and in what manner the same is to be performed, we declare that what we claim is:

A motion picture camera comprising a bottom, a front portion for the objective, shutter and the feeding device, a lateral portion at one side of the front portion connected to the bottom, driving gear in said lateral portion, an empty film case arranged alongside said lateral portion, a casing for the reception of a full film pivotally connected to the front portion of the camera and arranged to be folded against the front portion of the camera and bottom and alongside the empty film case, or to be raised therefrom, the said driving gear including a shaft coincident with the center of gravity of the camera and said camera having a pin arranged co-axially with said shaft and coacting therewith to form a cross-joint with the head of a tripod.

In witness whereof we affix our signatures.

Dr. ODO D. TAUERN.
Dr. NIKOLAUS LYON.